United States Patent [19]

Roddy et al.

[11] Patent Number: 5,018,813
[45] Date of Patent: May 28, 1991

[54] MULTICHANNEL INTEGRATED OPTIC MODULATOR FOR LASER PRINTER

[75] Inventors: James E. Roddy; Badhri Narayan, both of Rochester, N.Y.

[73] Assignee: Eastman Kodak Company, Rochester, N.Y.

[21] Appl. No.: 517,134

[22] Filed: May 1, 1990

[51] Int. Cl.$^5$ .............................................. G02B 6/10
[52] U.S. Cl. ............................. 350/96.14; 350/96.13
[58] Field of Search .............. 350/96.14, 96.15, 96.13, 350/96.11

[56] References Cited

U.S. PATENT DOCUMENTS

| | | | |
|---|---|---|---|
| 3,841,733 | 10/1974 | Ebersole | 350/96.14 |
| 4,153,328 | 5/1979 | Wang | 350/96.15 |
| 4,415,226 | 11/1983 | Verber et al. | 350/96.14 |
| 4,425,023 | 1/1984 | Matsumoto et al. | 350/96.14 |
| 4,425,024 | 1/1984 | Keil et al. | 350/96.14 |
| 4,462,658 | 7/1984 | Scifres et al. | 350/96.14 |
| 4,614,408 | 9/1986 | Mir et al. | 350/96.14 |
| 4,686,542 | 8/1987 | Yip et al. | 346/108 |
| 4,765,703 | 8/1988 | Suzuki et al. | 350/96.14 |
| 4,816,912 | 3/1989 | Suzuki et al. | 350/96.14 |
| 4,820,009 | 4/1989 | Thaniyavarn | 350/96.14 |
| 4,826,268 | 5/1989 | Kramer | 350/371 |
| 4,840,447 | 6/1989 | Kataoka | 350/96.14 |
| 4,904,034 | 2/1990 | Narayan et al. | 350/3.71 |
| 4,932,736 | 6/1990 | Su | 350/96.14 |
| 4,940,305 | 7/1990 | Thaniyavarn | 350/96.14 |

OTHER PUBLICATIONS

Komatsu et al., "Titanium/Magnesium Double Diffusion Method for Efficient Fibre-LiNbO$_3$ Waveguide Coupling", Aug. 14, 1986, *Electronics Letter*, vol. 22, No. 17.

Hunsperger, *Integrated Optics: Theory and Technology*, Springer-Verlag, 1982, pp. 17–29.

Suwat Thaniyavarn, "A Synthesized Digital Switch Using a 1×2 Directional Coupler with Asymmetric $\Delta\beta$ Phase Reversal Electrode", Integrated and Guided–Wave Optics 1988 Technical Digest Series, vol. 5 Conference Edition, pp. TuC6-1–TuC6-4, Santa Fe, N.M., Mar. 28–30, 1988.

Papuchan et al., "Electrically Switched Optical Directional Coupler: Cobra", Applied Physics Letters, vol. 27, No. 5, Sep. 1, 1975.

Schmidt et al., "Electro-Optically Switched Coupler with Stepped $\Delta\beta$ Reversal Using Ti-Diffused LiNbO$_3$ Waveguides", Applied Physics Letters, vol. 28, No. 9, May 1, 1976.

*Primary Examiner*—Ian J. Lobo
*Attorney, Agent, or Firm*—Parkhurst, Wendel & Rossi

[57] ABSTRACT

A multichannel integrated optics modulator is disclosed that generates one or more independently modulated scanning beams. The integrated optics modulator includes at least one waveguide channel provided on an electro-optic substrate, wherein the waveguide channel is divided into a write waveguide channel that extends to an output side of the substrate and a dead-end waveguide channel that terminates before reaching the output side of the substrate. Control signals are selectively applied to electrodes provided above the dead-end waveguide channel and the write waveguide channel to control the coupling of light from the write waveguide channel to the dead-end waveguide channel. Light is coupled out of the dead-end waveguide channel through the use of an absorber located above an end region of the dead-end channel. The integrated optics modulator is incorporated in a variety of scanner mechanisms.

16 Claims, 3 Drawing Sheets

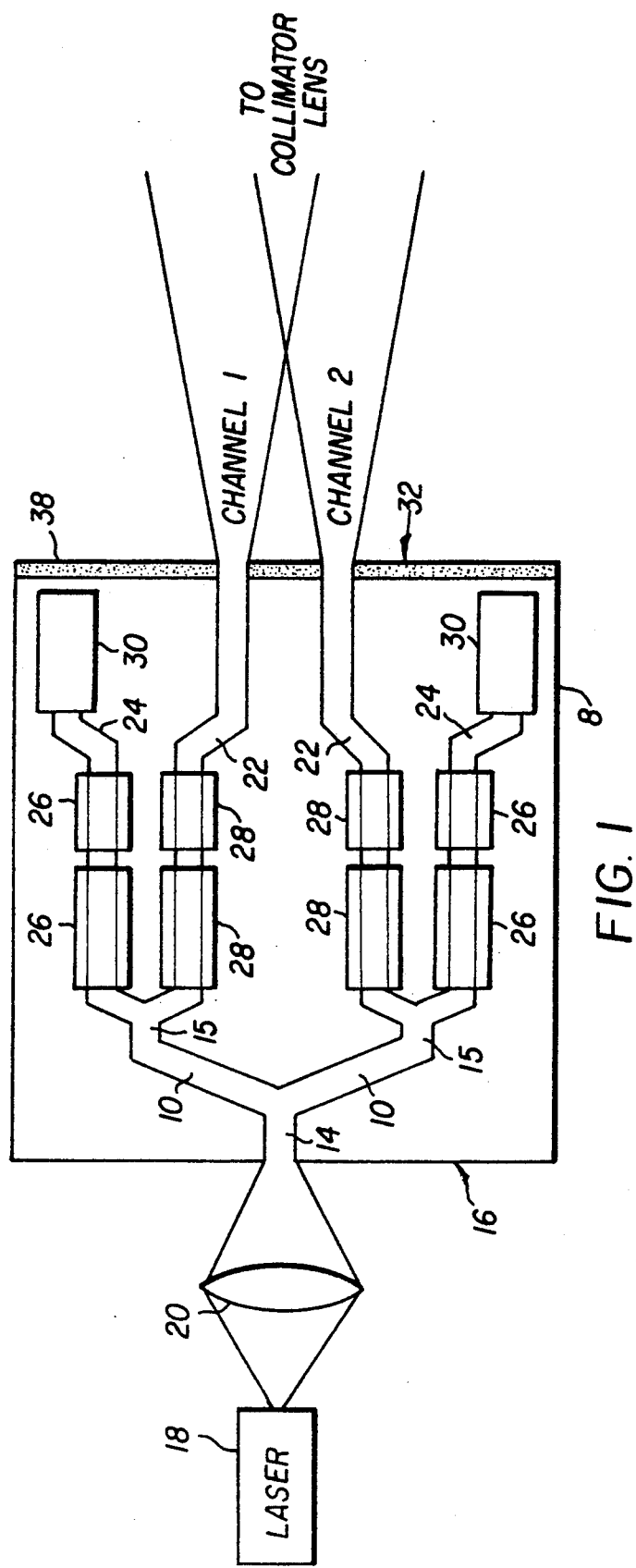
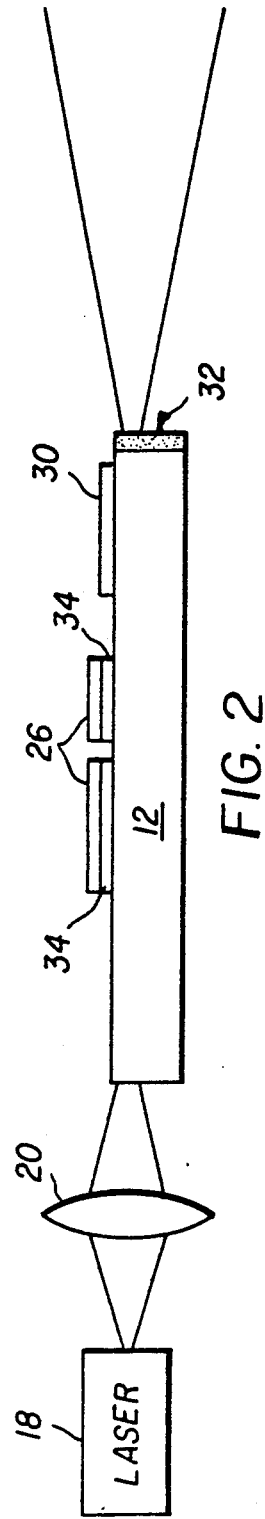
FIG. 1
FIG. 2

MULTICHANNEL INTEGRATED OPTIC MODULATOR FOR LASER PRINTER

TECHNICAL FIELD

The invention is related in general to devices that employ a plurality of scanning laser beams to either write information to or read information from a scanned target. More specifically, the present invention is related to an optical modulator that independently modulates the scanning laser beams.

BACKGROUND OF THE INVENTION

Laser scanning systems have been developed that utilize a scanning laser beam to either write information to or read information from a scanned target. A typical example of a laser scanning system that reads information is a point-of-sale cash register system that scans bar code labels provided on products. Typical laser scanning systems which write information include laser printers that write on electrostatic photoreceptors or photographic materials.

U.S. Pat. No. 4,904,034 issued to Narayan et al., for example, discloses a laser scanning system that writes information to a target station. The laser scanning system includes a laser diode which generates the write beam, an electronic laser driver that modulates the write beam by varying the laser current and a holographic scanning disc that is rotated by a motor. The collimated write beam is directed onto the rotating holographic scanning disc which diffracts the write beam. An F-theta lens following the scanning disc focuses the diffracted write beam on the target.

It is desirable, however, to increase the throughput rate of printers employing laser scanning technology while maintaining printing resolution capabilities. One approach to increasing the throughput rate would be to provide multiple laser scanning beams that would scan several image lines simultaneously. For example, a multiple laser diode array could be provided to generate multiple beams that would be scanned in a conventional manner. The use of a multiple laser diode array, however, would require that each laser diode have equivalent operating characteristics to prevent line-to-line variations in the scanned image. Slight variations in wavelength, power, beam divergence angles or beam aspect ratio within respective laser diodes results in the appearance of "banding", i.e. visible lines, in the produced image. The requirement for equivalent operating characteristics also makes it difficult to produce an acceptable multiple laser array at a reasonable cost.

Another approach to providing both an increased throughput rate is to generate multiple independently modulated scanning beams by using multiple RF carriers in a single acousto-optic device. Acousto-optic devices, however, are limited in bandwidth. It is also relatively difficult to equalize beam power and minimize crosstalk in such devices between the multiple scanning beams.

Accordingly, it is an object of the present invention to provide a scanning device having increased throughput for a given level of printing resolution. It is a further object to provide a device for generating a plurality of scanning beams that can be independently modulated.

SUMMARY OF THE INVENTION

The invention provides a scanning device having increased throughput while maintaining desired printing resolution capability. The present invention accomplishes the objects outlined above by providing a multichannel integrated optics modulator that generates one or more independently modulated scanning beams.

The integrated optics modulator of the present invention includes at least one waveguide channel provided on an electro-optic substrate, wherein the waveguide channel is divided into a write waveguide channel that extends to an output side of the substrate and a dead-end waveguide channel that terminates before reaching the output side of the substrate, at least one dead-end channel electrode and at least one write electrode respectively positioned above the dead-end waveguide channel and said write waveguide channel, and an input mechanism for coupling light into said waveguide channel at an input side of said substrate. Control signals are selectively applied to at least one of the dead-end channel electrode and the write electrode to control the coupling of light from said write waveguide channel to said dead-end waveguide channel. Light is coupled out of the dead-end waveguide channel through the use of an absorber located above an end region of the dead-end channel.

The integrated optics modulator is readily incorporated in both external and internal drum scanners. Multiple write beams generated by the integrated optics modulator enhances the throughput of the scanners while maintaining desired levels of resolution. Other objects, advantages and applications of the invention will become apparent in light of the detailed description of the preferred embodiments of the invention set forth below.

BRIEF DESCRIPTION OF THE DRAWINGS

With the above as background, reference should be made to the following detailed description of the preferred embodiments and the accompanying drawings in which:

FIG. 1 illustrates an integrated optics modulator in accordance with the present invention;

FIG. 2 illustrates a side view of the integrated optics modulator shown in FIG. 1;

DETAILED DESCRIPTION OF THE PREFERRED EMBODIMENT

Figure 3:
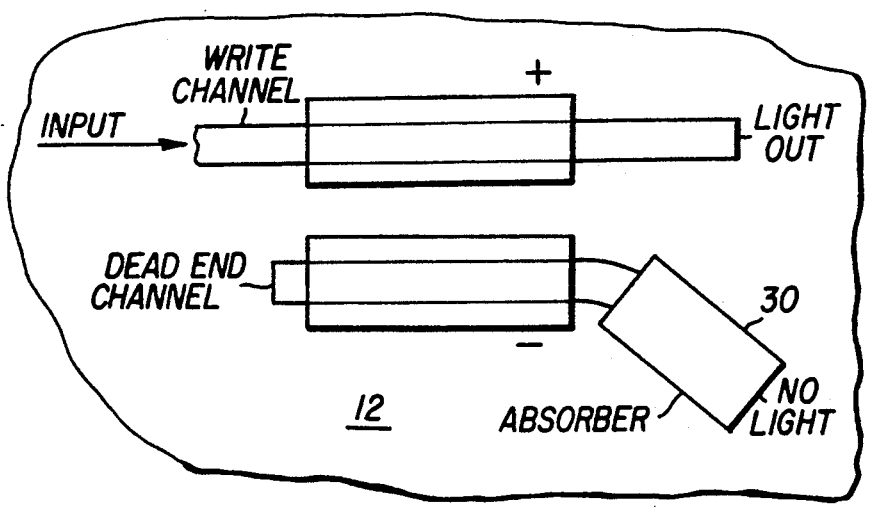
FIG. 3 illustrates a second electrode configuration that can be employed in the modulator illustrated in FIG. 1.

The invention is directed to providing a scanning device having improved throughput. Increased throughput is accomplished by providing a plurality of independently modulated scanning beams through the use of a multichannel integrated optics modulator. The integrated optics modulator is based, in part, on integrated optics devices developed for use in the field of telecommunications. The telecommunications field, however, is primarily interested in generating information by modulating a light beam and then switching the modulated beam from one channel to the next to reach a correct destination. In contrast, the application of integrated optics to laser printing requires the development of an integrated optics modulator that can produce a plurality of independently bilevel modulated (on/off) scanning beams or a plurality of independently modulated beams that can be used in a continuous mode for gray scale printing.

Referring now to FIG. 1, an integrated optics modulator 8 in accordance with the present invention is shown having one or more waveguide channels 10 located on a substrate 12. The waveguide channels 10 are coupled to a common input waveguide channel 14 that extends to an input side 16 of the substrate 12. The output of a laser 18 is focused on the common input channel 14 by a lens 20. Each of the waveguide channels 10 is split via a Y-coupler 15 into a write waveguide channel 22 and a dead-end waveguide channel 24. Dead-end channel and write channel electrodes 26 and 28 are respectively located over the dead-end waveguide channels 24 and the write waveguide channels 22. A light absorber 30 is located over the end of each of the dead-end waveguide channels 24. The write waveguide channels 22 extend to the output edge 32 of the substrate 12.

The substrate 12 is composed, for example, of Z-cut lithium niobate using TM propagation in the waveguides. The common input channel 14, waveguide channels 10, write waveguide channels 22 and dead-end waveguide channels 24 are formed of diffused titanium. In particular, a titanium/magnesium double diffusion as described in the article entitled "Titanium/Magnesium Double Diffusion Method for Efficient Fibre-$LiNbO_3$ Waveguide Coupling" by K. Komatsu et al, Electronics Letters, Vol. 22, No. 17, Aug. 14, 1986, the contents of which are hereby incorporated by reference, is preferred for forming the waveguide channels. In this waveguide fabrication method, Mg ions are diffused into the Ti-diffused waveguide surface which results in the refractive index at the waveguide surface being decreased. The decrease in the refractive index results in a symmetrical index profile which in turn provides a symmetrical output light beam that is particularly desirable for printing applications. The dead-end and write channel electrodes 26 and 28 are preferably composed of aluminum or gold and are formed on buffer layers 34 of indium tin oxide or silicon dioxide formed over the write waveguide channels 22 as illustrated in FIG. 2.

The absorber 30 is composed of an absorber material, preferably the same material used to form the dead-end and write channel electrodes 26 and 28, that is formed directly over two to ten millimeters of end regions of the dead-end waveguide channels 30 without an intermediate buffer layer and absorbs or couples light out of the end regions of the dead-end waveguide channels 30. In other words, the TM waves propagating through the dead-end channel 26 are absorbed and dissipated by the absorber 30. Alternatively, the absorber 30 is composed of a grating coupler which couples light out of the dead-end waveguide 24. Similarly, a prism can be employed at the end of the dead-end waveguide 24 instead of a grating coupler to cause light passing to the end of the dead-end waveguide channel 24 to be transmitted away from the substrate 12. The use of a grating coupler or prism coupler to couple light from a waveguide is discussed in INTEGRATED OPTICS: THEORY AND TECHNOLOGY, by R.G. Hunsperger, Springer-Verlag, 1982, the contents of which are hereby incorporated by reference, on pages 98–108.

It is also possible to delete the absorber 30 completely and simply end the dead-end waveguide channel 24 at a point before it reaches the output side 32 of the substrate 12. In such a case, light travelling in the dead-end waveguide channel 24 may scatter throughout the substrate and an optional mask 38, coated on the substrate 12 or consisting of a separate element, can be provided on the output side 32 of the substrate 12 to insure that only light emitted from the write waveguide channels 22 exits the output side 32 of the substrate 12. The optional mask 38 can also be employed, however, with the use of the absorbers 30 to insure stray light does not exit the output side 32 of the substrate 12.

In operation, the common input channel 14 is illuminated with light from the laser 18. The light travels through the waveguides 10 and is split between the write waveguide channels 22 and the dead-end waveguide channels 24 at the Y-couplers 15. Control signals are independently applied to each of the deadend and write electrodes 26 and 28 in a conventional manner to control the coupling of light from the write waveguide channels 22 to the dead-end waveguide channels 24. The electrodes can be operated in either a binary mode to cause substantially all of the light passing through the write waveguide channels 22 to couple to the dead-end channels 24 or a gray scale mode in which only a portion of the light is coupled from the waveguide channels 22 to the dead-end channels 24. Light passing through the write waveguide channels 22 exits the output side 32 of the substrate 12 as write beams or channels that are supplied to a collimator lens of a printing device described in greater detail below.

Figure 4:
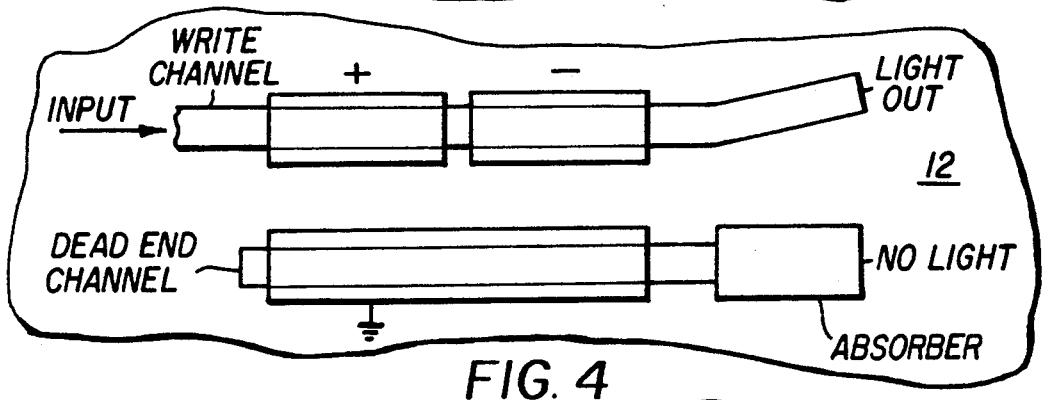
FIG. 4 illustrates a third electrode configuration that can be employed in the modulator illustrated in FIG. 1.

As stated above, the operation of the dead-end and write electrodes 26 and 28 to couple light therebetween is conventional. The operation of the dual split electrode structure, namely, where two electrodes are provided over the dead-end waveguide channel 24 and two electrodes are provided over the write waveguide channel 22 as illustrated in FIG. 1, was described in a paper entitled "A Synthesized Digital Switch Using a 1 ×2 Directional Coupler with Asymmetric $\Delta\beta$ Phase Reversal Electrode" by Suwat Thaniyavarn of Boeing Electronics, Integrated and Guided-Wave Optics 1988 Technical Digest Series, Vol. 5, Conference Edition, pp. TuC6-1 to TuC6-4, the contents of which are herein incorporated by reference, which was presented at the Integrated and Guide Wave Optics Topical Meeting, in Sante Fe, New Mexico on Mar. 28–30, 1988 sponsored by the Lasers and Electro-Optic Society of the IEEE and the Optical Society of America. Other electrode configurations, however, are of course possible. For example, FIG. 3 illustrates an electrode configuration wherein a single electrode is provided over each of the dead-end and write waveguide channels. This "single electrode" configuration is based on an optical directional coupler disclosed in the article entitled "Electrically Switched Optical Directional Coupler: Cobra" by Papuchon et al., Applied Physics Letters, vol. 27, No. 5, Sept. 1, 1975, the contents of which are hereby incorporated by reference. FIG. 4 illustrates a third electrode configuration wherein a single grounded electrode is provided over the dead-end waveguide channel 24 and a split electrode structure is formed over the write waveguide channel 22. The electrode configuration illustrated in FIG. 4 is shown in the article entitled "Electro-optically Switched Coupler with Stepped $\beta$ Reversal Using Ti-diffused $LiNbO_3$ Waveguides" by R.V. Schmidt et al., Applied Physics Letters, Vol. 28, No. 9, May 1, 1976, the contents of which are hereby incorporated by reference. The electrode structure of FIG. 1 is most preferred, however, as it is least sensitive to voltage drift.

Figure 5:
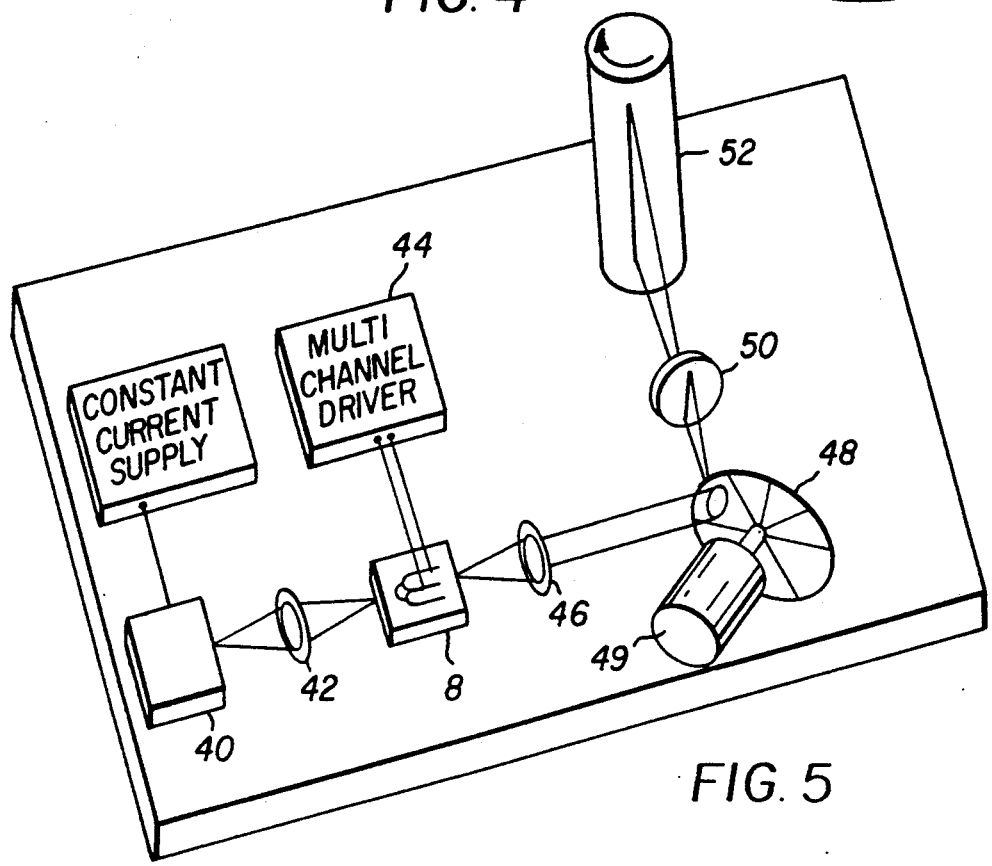
FIG. 5 illustrates an external drum laser scanning system incorporating the integrated optics modulator illustrated in FIG. 1.

FIG. 5 illustrates a laser printer incorporating the integrated optics modulator 8 shown in FIG. 1. The laser printer includes a laser source 40 (HeNe, laser diode, phase-locked laser diode array, etc.), a lens 42 which focuses the laser light onto the modulator 8, a multi-channel driver 44 which controls the operation of the dead-end and write electrodes provided in the modulator 8, a collimator lens 46 which directs the output from the modulator to a hologon disc 48 mounted on a scanner motor 49, and an F-theta lens 50 which focus the light deflected by the hologon scanner 48 onto a printing drum 52. The printing drum 52 can either be coated with a photosensitive material or be used to hold a printing medium coated with a photosensitive material.

Multiple lines of image information are simultaneously written to the film drum 52 by the multiple write channels or beams emanating from the modulator 8. Thus, overall scanning speed is greatly increased over single beam scanning systems. In addition, problems associated with generating multiple write beams from multiple sources are prevented as all of the write beams emanating from the modulator are generated from a single laser source. The spacing of the write waveguide channels 22 can also be set to provide any desired line spacing at the film drum 52. In a preferred embodiment, the write wavelength channels 22 are approximately four to five microns wide on fifteen to twenty micron centers at the output side 36 of the substrate 12. Rotating the integrated optics modulator 8 about the optical axis, slight overexposure of the film or moving of the film slightly out of focus can be used to fill line-to-line spacing gaps if required.

Figure 6:
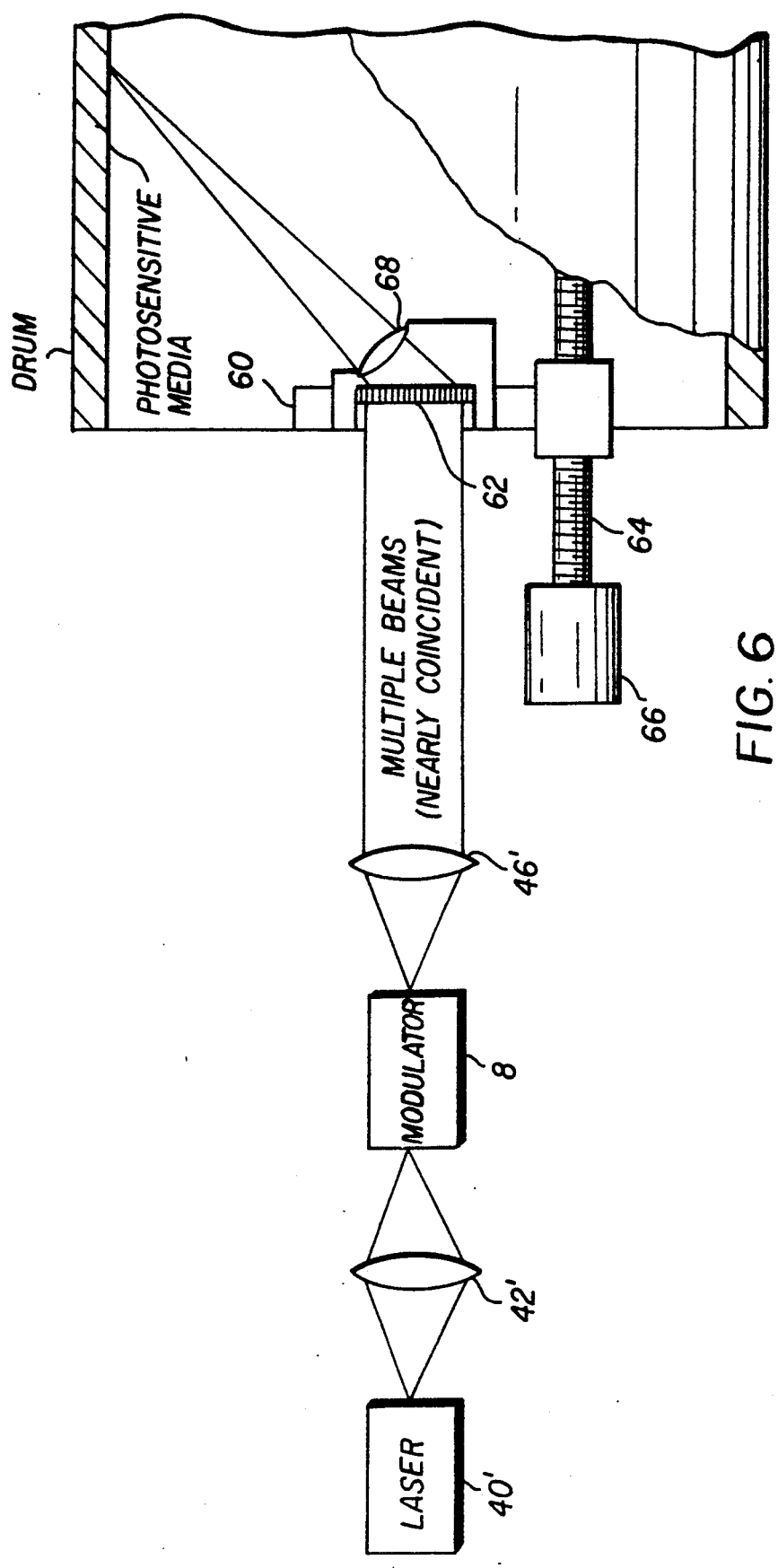
FIG. 6 illustrates an internal drum laser scanning system incorporating the integrated optics modulator illustrated in FIG. 1.

The disclosed modulator can also be incorporated in other types of scanning systems. FIG. 6, for example, illustrates an internal drum scanner incorporating the integrated optics modulator 8 illustrated in FIG. 1. The write beams from the modulator 8 are supplied to scanner assembly including a motor 60 having a rotor structure that includes a single facet hologon 62. The motor 60 is mounted to a lead screw assembly 64 that is driven by a lead screw motor 66 to provide lateral movement of the scanner assembly. The write beams are deflected by the hologon 62 and are focused by a lens 68 on the internal surface of a scanning drum 70. A photosensitive media is positioned on the internal surface of the scanning drum 70.

The invention has been described with particular reference to certain preferred embodiments thereof. It will be understood, however, that modification and variations are possible within the spirit and scope of the appended claims. For example, while the disclosed integrated optics modulator has particular utility in laser printers, it can also be employed in laser scanning systems that require a plurality of beams to read information from a scanning target. In addition, while the embodiment illustrated in FIG. 1 illustrates two write channels, it is readily apparent that additional write channels can be provided by including additional waveguide structures on the substrate. Further, the coupling of light into the waveguides can be accomplished in a variety of ways other than the use of the common input channel 14. For example, each of the waveguides 10 can extend to the input side of the substrate and be illuminated by the laser source. The laser light can also be directly supplied to the substrate using fiber optics.

What is claimed is:

1. An integrated optics modulator comprising:
   at least one input waveguide channel provided on an electro-optic substrate, wherein said input waveguide channel is divided into a write waveguide channel that extends to an output side of said substrate and a dead-end waveguide channel that terminates before reaching said output side of said substrate;
   at least one dead-end channel electrode and at least one write electrode respectively positioned above said dead-end waveguide channel and said write waveguide channel; and
   input means for coupling light into said input waveguide channel at an input side of said substrate.

2. An integrated optics modulator as claimed in claim 1, further comprising means for selectively applying signals to at least one of said dead-end channel electrode and said write electrode to control the coupling of light from said write waveguide channel to said dead-end waveguide channel.

3. An integrated optics modulator as claimed in claim 1, further comprising an absorber located above an end region of said dead-end channel.

4. An integrated optics modulator as claimed in claim 3, wherein said absorber comprises an electrode material formed directly on said dead-end channel.

5. An integrated optics modulator as claimed in claim 3, wherein said absorber comprises a grating coupler.

6. An integrated optics modulator as claimed in claim 3, wherein said absorber comprises a prism.

7. An integrated optics modulator as claimed in claim 1, further comprising a mask located on said output side of said substrate.

8. A laser printer comprising:
   an integrated optics modulator including at least one input waveguide channel provided on an electro-optic substrate, wherein said input waveguide channel is divided into a write waveguide channel that extends to an output side of said substrate and a dead-end waveguide channel that terminates before reaching said output side of said substrate, at least one dead-end channel electrode and at least one write electrode respectively positioned above said dead-end waveguide channel and said write waveguide channel;
   input means for coupling light into said input waveguide channel at an input side of said substrate;
   control means for selectively applying signals to at least one of said dead-end channel electrode and said write electrode to control the coupling of light from said write waveguide channel to said dead-end waveguide channel; and
   output means for scanning light passing through said write waveguide channel and out of said output side of said substrate on a scanning target.

9. A laser printer as set forth in claim 8, wherein said output means includes a scanning assembly which focuses said light passing through said write waveguide channel on an external surface of a scanning drum.

10. A laser printer as set forth in claim 8, wherein said output means includes a scanning assembly which focuses said light passing through said write waveguide channel on an internal surface of a scanning drum.

11. A laser printer as claimed in claim 8, wherein said integrated optics modulator further includes an absorber located above an end region of said dead-end channel.

12. A laser printer as claimed in claim 11, wherein said absorber comprises an electrode material formed directly on said dead-end channel.

13. A laser printer as claimed in claim 11, wherein said absorber comprises a grating coupler.

14. A laser printer as claimed in claim 11, wherein said absorber comprises a prism.

15. A laser printer as claimed in claim 8, wherein said integrated optics modulator further includes a mask located on said output side of said substrate.

16. A laser printer as claimed in claim 8, wherein said integrated optics modulator generates a plurality of write beams.

* * * * *